UNITED STATES PATENT OFFICE.

WILLIAM M. GROSVENOR, OF NEW YORK, N. Y., ASSIGNOR TO PERKINS GLUE COMPANY, A CORPORATION OF PENNSYLVANIA.

VEGETABLE GLUE AND PROCESS OF MAKING SAME.

1,378,105.     Specification of Letters Patent.     Patented May 17, 1921.

No Drawing.     Application filed December 8, 1917. Serial No. 206,144.

*To all whom it may concern:*

Be it known that I, WILLIAM M. GROSVENOR, a citizen of the United States, and a resident of New York, in the county of New York and State of New York, have invented certain new and useful Improvements in Vegetable Glue and Processes of Making the Same, of which the following is a specification.

The invention relates to improvements in vegetable glue and processes of making the same. More particularly, the invention relates to the production of a substantially neutral vegetable glue having substantially the qualities of animal glue for gluing up veneers.

In United States Reissue Letters Patent No. 13436, dated July 2, 1912, and in U. S. Letters Patent No. 1020656, 1078691, 1078692, and 1200488, there are disclosed methods of making vegetable glue by dissolving a starchy carbohydrate with caustic alkali, such as caustic soda, the resulting glue being markedly alkaline. Even if the percentage of caustic alkali be reduced to about 3% based on the dry weight of the starch, and heat be used to aid the solution of the starch, the glue is sufficiently alkaline so that when applied to very thin veneers of certain woods, it will cause a discoloration of the wood veneer, which discoloration may appear on the opposite side of the wood layer from that on which the glue is applied. In many cases, this discoloration is not a serious disadvantage, but in other cases, especially where very thin layers of fine wood are being glued together, this discoloration or staining may be a detriment which it is very desirable to avoid.

According to the present invention, instead of using caustic alkali as a means for putting the starch base into solution, I use a substantially neutral solvent of starch cellulose for that purpose. By "neutral," I do not necessarily mean that the solvent is absolutely neutral commercially, but that it has so little alkaline action that the staining or discoloration is substantially eliminated, or, at least, substantially reduced.

In producing the new glue, I take a suitable starchy carbohydrate, preferably the glue base described in one or another of said U. S. Letters Patent, although certain starches appear on the market which require no treatment to adapt them to the solution process. Whether such starch is suitable may be easily determined by testing the same. I preferably use cassava starch or tapioca flour.

In order that those skilled in the art may clearly understand the invention, I will illustrate the same by specific examples.

Example 1: 29 pounds of tri-sodium phosphate are dissolved in 225 pounds of water, and 100 pounds of the starch base are mixed therein and heated to about 165° F. and stirred until the batch comes across from the mixture of suspended starch to a homogeneous colloidal solution having substantially the adhesive and other properties of animal glue for gluing up high-grade veneers. The resulting glue solution is capable of flowing through pipes 2 inches in diameter and of being spread by machinery, so that it may be used for gluing wood veneers in a manner similar to animal glue. This glue is not entirely stainless, but the stain is substantially reduced.

Example 2: A solution of sodium aluminate is first prepared by dissolving freshly precipitated aluminum hydroxid containing about 15% actual Al(OH)$_3$, washed nearly free from salts, in the molecular quantity of caustic soda in solid form (about 96% NaOH) to produce sodium aluminate. This solution should contain 22.3% of sodium aluminate Na$_3$AlO$_3$. About 24.6 pounds of this solution containing about 5.5 pounds of Na$_3$AlO$_3$, are added to 250 pounds of water and 100 pounds of the starchy carbohydrate base is then stirred in, and the temperature raised to about 160° F. until it goes across into a homogeneous glue solution and it is then stirred until cold. If desired, the aluminum hydroxid may be added after the starch has been suspended in cold water containing the 3.5% caustic soda, and then the temperature raised, the liquid then containing actually, or in effect, Na$_3$AlO$_3$. With this glue, it is frequently desirable to use more water, so that in the final glue, there may be substantially more than 3 parts of water to 1 part of the starch base, and sometimes, for reasons not altogether understood, it is desirable to add about 10% more of the Na$_3$AlO$_3$ than above indicated. Certain qualities of commercial sodium aluminate may be used successfully in the proportion of 5½%, based on the dry weight of the starch base, or the carbohydrate may be first dissolved with 3% caustic soda and when the ordinary glue has been produced 1.95% (dry weight) of moist freshly prepared aluminum hydroxid may then be added.

Example 3: 100 pounds of the starch base are added to 17½ pounds of tri basic acetate of lead dissolved in 300 or 325 pounds of water. This mixture should be heated to about 160° F. and should be given a prolonged stirring (say approximately 2 hours) to bring it across from the mixture of suspended starch to a homogeneous colloidal solution of starch to form the glue. During this treatment air circulation should be as far as possible excluded. When it has been completely brought across, it must be judged from the texture of the glue rather than from its color, since the glue appears whitish, owing to the formation of some lead carbonate with the carbonic acid from the water and air. Somewhat more water may be required unless a very viscous glue is desired. Indeed, from 4 to 8 parts of water may be used depending upon the quality or viscosity of starch glue base used and the amount of lead acetate used, the lead acetate appearing to act as a water retaining material. A similar increase of water may be obtained with other solvents or other materials, as for instance, with the starch glue base, another water retaining material like gum tragacanth may be used. Other salts, such as aluminum sulfate, may also be used as the solvent of starch cellulose to form the glue solution.

Example 4: 100 pounds of starch, 31 pounds of a 40% formaldehyde solution and 165 pounds of water are thoroughly stirred and heated to about 130° F. and then $\frac{2}{10}$ of a pound of caustic soda dissolved in water to make a 33% solution is stirred in, and the stirring is then continued thereafter for about 20 minutes, whereupon the whole mass comes across into a clear homogeneous colloidal solution. This glue is practically stainless and is readily made wholly stainless, if desired, by the stirring in of 0.5 pound of ammonium sulfate dissolved in about 15 parts of water.

As will be clearly understood by those skilled in the art, various other relatively neutral solvents of starch cellulose may be used for bringing across the starch and water into a homogeneous colloidal glue solution with or without the use of heat in combination therewith. Many other changes may also be made without departing from the spirit and scope of the invention in its broader aspects.

What I claim as new and desire to secure by Letters Patent is:

1. The process of making vegetable glue, which consists in dissolving a starchy carbohydrate in about 3 parts or less by weight of water and a substantially neutral solvent of starch cellulose, to produce a substantially neutral glue solution, the starchy carbohydrate being such that the resulting glue solution has substantially the properties of animal glue for gluing up high grade wood veneers.

2. The process of making vegetable glue, which consists in dissolving a starchy carbohydrate in the absence of caustic alkali and in about 3 parts or less by weight of water and a substantially neutral solvent of starch cellulose, the starchy carbohydrate being such that the resulting glue solution has substantially the properties of animal glue for gluing up wood veneers.

3. The process of making vegetable glue, which consists in dissolving a starchy carbohydrate in water by means of a substantially neutral solvent of cellulose to form a substantially neutral viscous glue solution, the starchy carbohydrate being such that the resulting glue solution has substantially the properties of animal glue for gluing up wood veneers.

4. The process of making vegetable glue, which consists in dissolving a starchy carbohydrate in about 3 parts or less by weight of water and a substantially neutral salt solvent of starch cellulose, to produce a substantially neutral glue solution, the starchy carbohydrate being such that the resulting glue solution has substantially the properties of animal glue for gluing up wood veneers.

5. The process of making vegetable glue, which consists in dissolving a starchy carbohydrate in water by means of a substantially neutral salt solvent of cellulose, to form a substantially neutral viscous glue solution, the starchy carbohydrate being such that the resulting glue solution has substantially the properties of animal glue for gluing up wood veneers.

6. The process of making vegetable glue which consists in dissolving a starchy carbohydrate in water by means of trisodium phosphate to form a substantially neutral viscous glue solution, the starchy carbohydrate being such that the resulting glue solution has substantially the properties of animal glue for gluing up wood veneers.

7. The process of making vegetable glue which consists in dissolving a starchy carbohydrate in about 3 parts or less by weight of water by means of trisodium phosphate.

8. The improved vegetable glue which comprises a starchy carbohydrate dissolved with a substantially neutral salt solvent of cellulose in about 3 parts or less by weight of water, and being substantially neutral and having substantially the properties of animal glue for gluing up veneers.

9. The improved vegetable glue which comprises a starchy carbohydrate dissolved with a substantially neutral solvent of cellulose in water, and being substantially neutral and having substantially the properties of animal glue for gluing up veneers.

10. The improved vegetable glue which comprises a viscous solution of a starchy carbohydrate in about 3 parts or less by weight of water with trisodium phosphate, and having property of flowing through pipes 2 inches in diameter and of being spread by machinery and having substantially the adhesiveness of animal glue for gluing up veneers.

Signed at New York, in the county of New York and State of New York, this 6th day of December, A. D. 1917.

WILLIAM M. GROSVENOR.